(12) United States Patent
Hermann et al.

(10) Patent No.: US 10,820,521 B2
(45) Date of Patent: Nov. 3, 2020

(54) VOLUME SENSOR FOR COMBINE HARVESTER TAILINGS RETURN SYSTEM

(71) Applicant: AGCO International GmbH, Neuhausen (CH)

(72) Inventors: Dan Hermann, Randers (DK); Morten Leth Bilde, Langaa (DK)

(73) Assignee: AGCO International GmbH, Neuhausen (CH)

( * ) Notice: Subject to any disclaimer, the term of this patent is extended or adjusted under 35 U.S.C. 154(b) by 0 days.

(21) Appl. No.: 16/652,882

(22) PCT Filed: Oct. 4, 2018

(86) PCT No.: PCT/EP2018/076990
§ 371 (c)(1),
(2) Date: Apr. 1, 2020

(87) PCT Pub. No.: WO2019/068805
PCT Pub. Date: Apr. 11, 2019

(65) Prior Publication Data
US 2020/0245562 A1   Aug. 6, 2020

(30) Foreign Application Priority Data
Oct. 7, 2017   (GB) .................................. 1716446.8

(51) Int. Cl.
*A01D 41/127*   (2006.01)
*A01F 12/52*   (2006.01)
(Continued)

(52) U.S. Cl.
CPC ............ *A01F 12/52* (2013.01); *A01D 41/127* (2013.01); *A01F 12/18* (2013.01); *A01F 12/46* (2013.01);
(Continued)

(58) Field of Classification Search
CPC ... A01D 41/127; A01D 41/1271; A01F 12/18; A01F 12/46; A01F 12/52
(Continued)

(56) References Cited

U.S. PATENT DOCUMENTS 4,441,513 A * 4/1984 Herwig ................ A01D 41/127
250/223 R
6,053,811 A   4/2000 Johnson et al.
(Continued)

FOREIGN PATENT DOCUMENTS

EP   0463240 A1   1/1992
EP   1 704 767 A1   9/2006
(Continued)

OTHER PUBLICATIONS

European Patent Office, International Search Report for International Application No. PCT/EP2018/076990, dated Jan. 30, 2019.
(Continued)

*Primary Examiner* — Robert E Pezzuto

(57) ABSTRACT

A combine harvester tailings return system includes a tailings conveyor and an ejection channel for depositing tailings upstream of a cleaning system. A proximity sensor is mounted to the ejection channel and is configured to sense the height of a layer of tailings during transit through the returns system.

11 Claims, 3 Drawing Sheets

(51) Int. Cl.
    *A01F 12/46*    (2006.01)
    *A01F 12/18*    (2006.01)
    *B65G 33/26*    (2006.01)

(52) U.S. Cl.
    CPC ... *A01F 2012/188* (2013.01); *B60Y 2200/222* (2013.01); *B65G 33/265* (2013.01)

(58) Field of Classification Search
    USPC .......... 56/10.2 C, 10.2 R; 460/1, 6, 13, 114, 460/119
    See application file for complete search history.

(56) References Cited

U.S. PATENT DOCUMENTS

| | | |
|---|---|---|
| 6,115,115 A | 9/2000 | Skarie et al. |
| 2017/0013776 A1 | 1/2017 | Palla et al. |
| 2017/0311543 A1* | 11/2017 | Leenknegt ................ A01F 7/06 |

FOREIGN PATENT DOCUMENTS

| | | |
|---|---|---|
| EP | 3238528 A1 | 11/2017 |
| KR | 20130102408 A | 9/2013 |
| WO | 2009/034442 A2 | 3/2009 |

OTHER PUBLICATIONS

UK Intellectual Property Office, Search Report for Priority Application No. GB1716446.8, dated Apr. 6, 2018.

* cited by examiner

VOLUME SENSOR FOR COMBINE HARVESTER TAILINGS RETURN SYSTEM

FIELD

This disclosure relates to combine harvesters and particularly to tailings return systems used therein, wherein the tailings return system serves to collect tailings screened out from a crop material stream by a grain cleaning system, and return the tailings to a location in the combine harvester upstream of the grain cleaning system for reprocessing.

BACKGROUND

The use of combine harvesters, hereinafter referred to as "combines," in the agriculture industry is well established, and so too are the principles upon which they operate. In general, combines carry a header for cutting and/or gathering a crop as the machine is driven across a crop field. The crop stream passes through threshing apparatus and separating apparatus. Residue straw is ejected from the rear of the machine either in a deposited windrow for subsequent baling, or chopped and spread. The portion of crop material, typically made up of grain and material other than grain (MOG) such as chaff and unthreshed seed heads, is conveyed to a grain cleaning system which uses sieves together with a cleaning airstream. Clean grain passing through the sieves is conveyed to an on-board grain tank. Lighter material including chaff and straw is blown out of the rear of the cleaning system by the cleaning airstream. Material that is screened out by the sieves is referred to as tailings, and these tailings typically have a high proportion of unthreshed heads.

A tailings return system collects the tailings and return them to a location upstream in the crop processing apparatus. In some combines, the tailings are returned to the threshing apparatus, whereas in other machines the tailings are returned to a grain pan upstream of the grain cleaning system but downstream of the threshing and separating apparatus. In the latter case, the tailings return system may include a secondary threshing device for processing the tailings before being returned.

During operation, the settings of the various processing apparatus may be changed to adapt to changing harvesting conditions and/or desired harvest outcomes. For example, the speed of the fan that generates the cleaning airstream may be changed to improve cleaning without excessive grain loss. In another example, the sieve openings may be adjusted. Selecting the various settings was traditionally done manually by the operator based on observations and experience. However, in recent years, technology has evolved to provide for automatic-setting systems that monitor the status of the crop flow at various locations in the combine and automatically adjust the settings accordingly.

The total volume of material in the tailings return system is an important input parameter for automatic setting combines and it is known to provide one or more sensors to provide this information during operation. U.S. Pat. No. 6,115,115, "Volume Sensor for Paddle Elevator Using Laser Light," granted Sep. 5, 2000, discloses a tailings return system fitted with a laser-based volume sensor that measures the height of the tailings material stream inside a paddle conveyor. However, it has been found that such a sensing arrangement is suitable only for paddle elevators where the material is static upon the paddle.

BRIEF SUMMARY

In some embodiments, a combine harvester includes a frame having a pair of side walls, a grain cleaning system located between the side walls, and a tailings return system arranged to collect tailings ejected by the cleaning system, wherein the tailing return system has a conveyance channel located outboard of the side walls, an ejection channel connected between a downstream end of the conveyance channel and an opening in one of the side walls at a location upstream of the cleaning system, and a proximity sensor mounted to the ejection channel and configured to sense a thickness of a material layer present therein.

The ejection channel is typically devoid of any moving mechanical components and so the signal produced by the proximity sensor is 'cleaner' and a more reliable representation of the tailings volume.

The proximity sensor can be conveniently mounted on an exterior surface of the ejection channel against a window provided in a wall.

The proximity sensor may be an infrared proximity sensor.

In some embodiments, the tailings return system also includes an impellor housed upstream of the ejection channel. The impellor has a plurality of paddles operable to rotate and project a tailings stream toward and through the ejection channel. In such an arrangement, the paddles fling the tailings stream into and through the ejection channel. The impellor may be housed inside the downstream end of the conveyance channel.

The tailings return system may include a screw conveyor extending inside of the conveyance channel, wherein the impellor and screw conveyor are mounted upon a common shaft. Therefore, the screw conveyor is operable to deliver the tailings stream direct to the impellor.

The combine may also include threshing and separating apparatus, wherein the side wall opening is located downstream of the threshing and separating apparatus. In this arrangement the tailings may be delivered onto a grain pans, or a "preparation pan," immediately upstream of the cleaning system. A secondary threshing unit by the tailings return unit may thresh the tailings before returning into the combine.

In an alternative arrangement, the tailings may be delivered upstream of the (primary) threshing apparatus so as to avoid the need for a secondary threshing unit and to use the threshing apparatus to re-thresh the tailings.

BRIEF DESCRIPTION OF THE DRAWINGS

Further advantages of the disclosure will become apparent from reading the following description of specific embodiments with reference to the appended drawings in which.

DETAILED DESCRIPTION

Relative terms such as forward, rearward, transverse, lateral, longitudinal, and sideways are in reference to the normal forward direction of travel of the combine 10 and indicated by arrow F. The terms vertical and horizontal are in reference to the level ground 101 upon which the combine 10 is disposed. In other words, the Cartesian axes of 'longitudinal', 'transverse', and 'vertical' are made in relation to the frame 12 of combine 10 and are not affected by any slope in the ground. The terms "upstream" and "downstream" are in reference of the general direction of crop flow along the material conveyance systems described.

Figure 1:
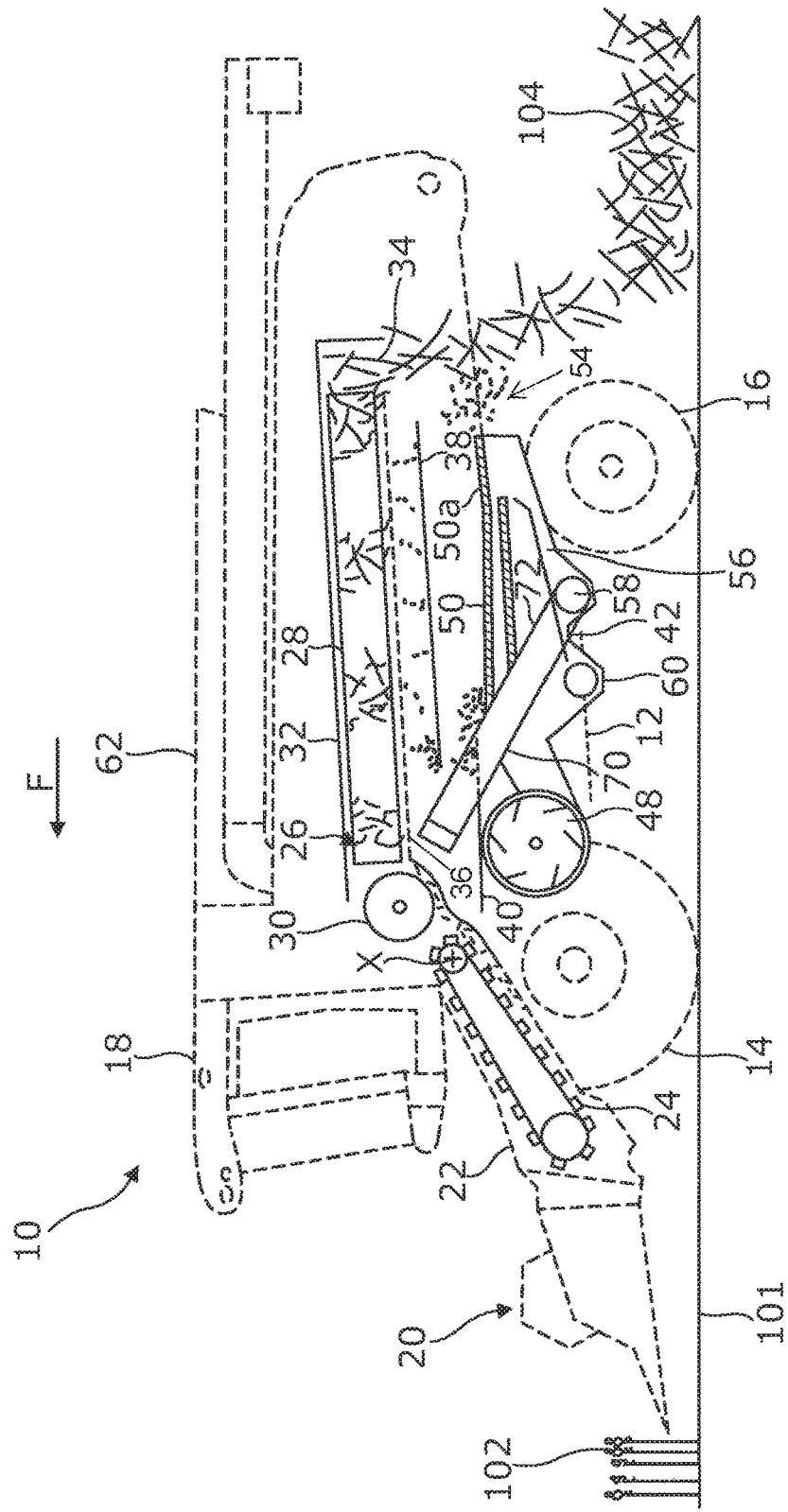
FIG. 1 is a side view of a combine harvester revealing, in schematic form, a grain cleaning system and a tailings return system.

FIG. 1 illustrates in schematic form the main components of a crop processing system of a combine harvester 10 and will be used to explain the flow of material below. The crop processing system is shown in solid lines, and the outline profile of harvester 10 is shown in dotted lines.

Combine harvester 10, hereinafter referred to as 'combine,' includes a frame 12 supported on front wheels 14 and rear steerable wheels 16 that engage the ground 101. A driver's cab 18 is also supported on the frame 12, and houses a driver's station from where a driver controls the combine 10.

A cutting header 20 is detachably supported on the front of a feederhouse 22, which is pivotable about a transverse axis X to lift and lower the header 20 in a conventional manner.

The combine 10 is driven in a forward direction (arrow F) across a field of standing crop 102 in a known manner. The header 20 serves to cut and gather the standing crop material before conveying the crop material as a crop material stream into feederhouse 22. An elevator 24, normally in the form of a chain-and-slat elevator as shown, is housed within the feederhouse 22 and serves to convey the crop material stream upwardly and rearwardly from the header 20 to the crop processor, designated generally at 26. At this stage, the crop material stream is unprocessed.

The crop processor 26 (i.e., a threshing and separating apparatus) includes a pair of axial flow threshing and separating rotors 28 fed by a tangential flow, crop material impelling, feed beater 30.

The feed beater 30 rotates on a transverse axis and comprises crop engaging vanes (not shown) which convey the crop material stream under the beater and into rotor housings 32, which each house one of the rotors 28. Only the left-hand rotor 28 and housing 32 is shown in FIG. 1, and the right-hand equivalent is hidden from view.

Axial flow rotors 20 thresh the crop stream in a front region, separate the grain therefrom in a rear region, and eject the straw residue through an outlet 34 in the housing 32 at the rear of the machine either directly onto the ground in a windrow 104 as shown, or via a straw chopper (not shown).

A part-cylindrical grate 36 in the underside of each rotor housing 32 allows the separated material to fall by gravity onto either a return pan 38 located below a rear section of the processor 26, or directly onto a preparation pan 40 located below a front section of the processor 26. The separated material falling through the grate 36 is typically a mix of grain and material other than grain (MOG) which may include chaff, unthreshed seed head, and some straw.

The twin rotor axial flow processor 26 shown is one example of a known threshing and separating apparatus employed in combines today. Other known, and well established, types of crop processors include single rotor axial flow processors, tangential flow/straw walker (or conventional) processors, and hybrid processors.

The return pan 38 and preparation pan 40 together serve as a material conveyance system arranged to convey the separated crop material to a grain cleaning shoe designated generally at 42.

The grain-MOG mix falls from the preparation pan 40 into the cleaning shoe 42, where the cascading mix is subjected to a cleaning airstream generated by fan 48, before falling onto the front of upper sieve or chaffer 50.

Chaffer 50 has adjustable louvres supported on a frame which is driven in fore-and-aft oscillating manner. The material that settles on the chaffer 50 is conveyed in a generally rearward direction. The heavier, smaller grain-rich material passes between the louvres onto an underlying lower sieve 52, whereas the lighter, larger material passes to the end of the chaffer and out of the rear of the machine at 54. A rear section of chaffer 50a is usually independently adjustable and is configurable to allow un-threshed seed heads to pass therethrough into a tailing collection channel 56.

Lower sieve 52 is also driven in an oscillating manner to convey the collected grain-MOG mix rearwardly, wherein the material falling therethrough is collected by a clean grain auger 60 for conveyance to an elevator (not shown) for onward conveyance to a grain tank 62. Tailings that are screened out by the lower sieve 52 fall off the rear edge thereof and into the tailing collection channel 56.

Figure 3:
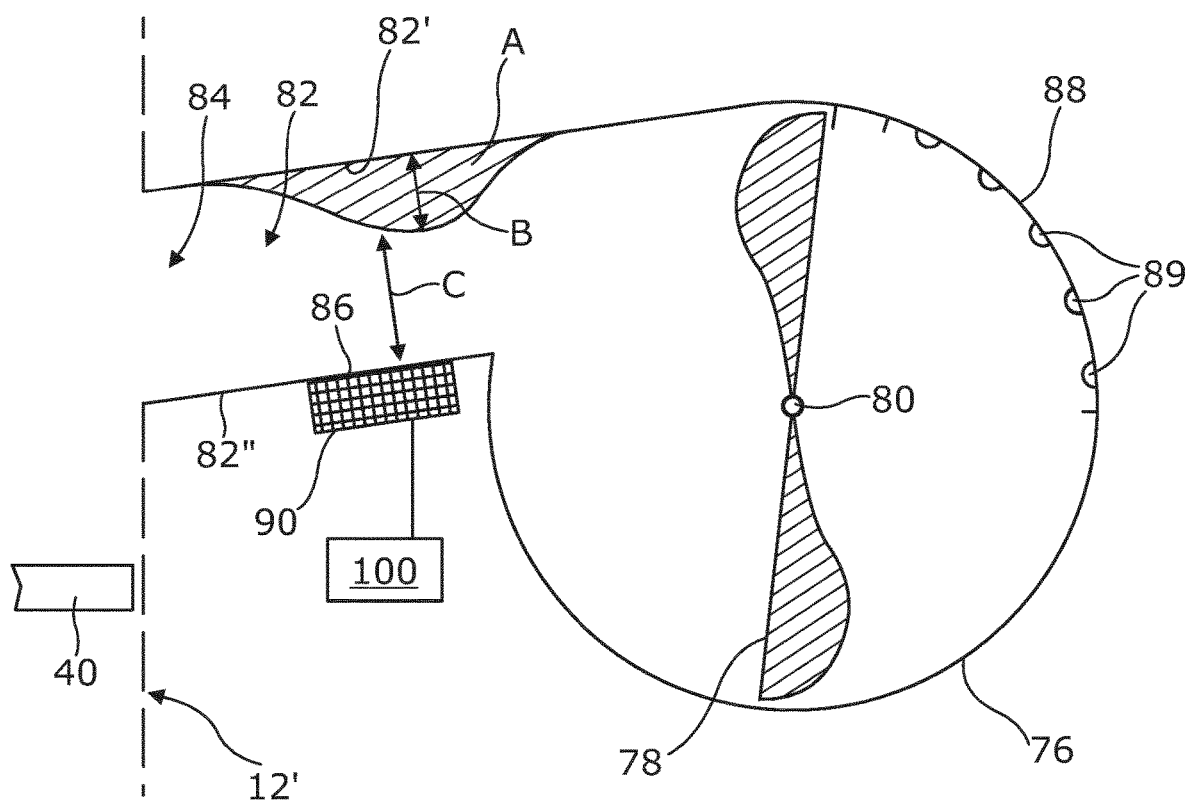
FIG. 3 is a schematic sectional view taken along the line III-III of FIG. 2.

A tailings return system 70 is provided to collect the tailings from the tailings collection channel 56 and convey, or 'return' the tailings to the preparation pan 40. The tailings return system 70 includes a tailings collection auger 58 in a trough at the base of the tailings collection channel 56, the auger 58 being operable to deliver the tailings to one side of the combine (the left-hand side in the illustrated embodiment) and into an inlet of a tailings conveyor 72 which is external the left-hand side wall 12' (FIG. 3).

Figure 2:
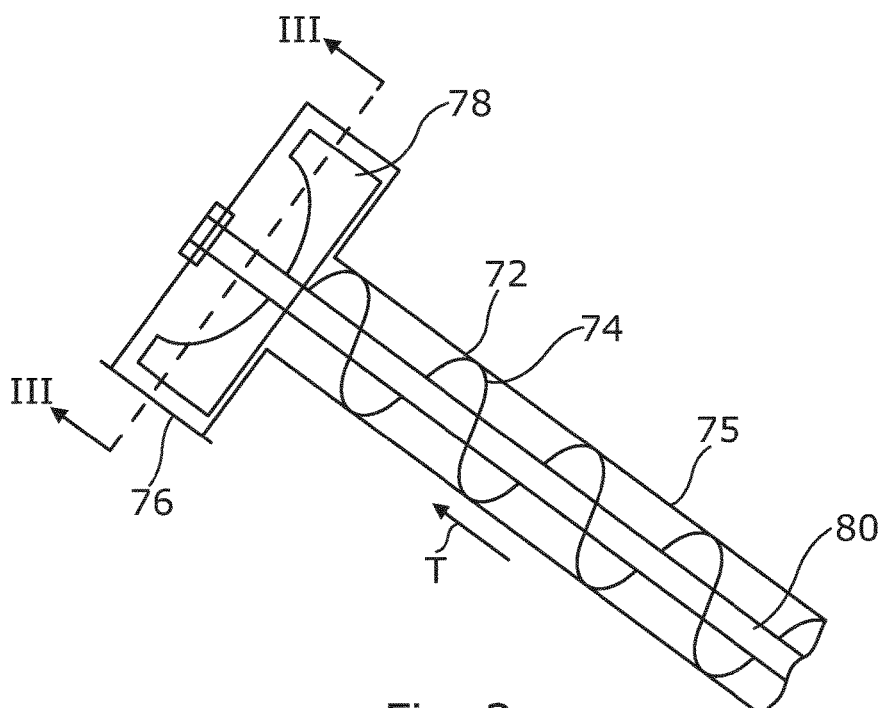
FIG. 2 is a schematic vertical sectional view of part of the tailings return system shown in FIG. 1.

With reference to FIG. 2, the tailings conveyor 72 has a screw conveyor 74 inside a tailings conveyance channel 75, the screw conveyor 74 being operable to convey the tailings from the collection auger 58 upwardly and forwardly (in the direction of arrow T) through the conveyance channel 75 into an impellor housing or drum 76 located at a downstream end of the conveyance channel 75.

An impellor 78 is housed within the impellor housing 76 and has a pair of paddles mounted to a shaft 80, which is common with the screw conveyor 74. The impellor 78 is operable to rotate and project a tailings stream toward and through an ejection channel 82 as best seen in FIG. 3.

The tailings conveyor 72 is mounted externally of, and extends parallel to, the side wall 12', which side wall 12' can be considered as part of frame 12. Although the illustrated embodiment includes a screw conveyor, alternative conveyors can be employed. For example, the screw conveyor 74 can be replaced with a paddle-type conveyor as is known in the art.

Turning back to FIG. 3, the paddles of the impellor 78 rotate with the shaft 80 and propel the tailings stream tangentially from the impellor housing 76 into the ejection channel 82. The ejection channel 82 provides a conduit through an opening 84 provided in the side wall 12' above the preparation pan 40. The tailings stream is projected onto the preparation pan 40, through the ejection channel 82, by the impellor 78.

In the illustrated embodiment, a secondary threshing unit 88 is provided in the tailings return system 70 to thresh the tailings before the stream is returned to the preparation pan 40. The secondary threshing unit 88 is integrated into the impellor housing 76 and has an interchangeable arcuate cover section that includes a plurality of threshing bars 89 secured to the inner surface thereof. The rotating paddles of impellor 78 interact with the threshing bars 89 to perform a threshing action upon the tailings stream carried thereby.

When harvesting a crop that does not require re-threshing, then the cover can be replaced with a cover having no threshing bars.

Although described as being located proximate to the preparation pan 40, the opening 84 in the side wall 12' can be located in alternative positions depending upon where the tailings are to be returned. In an alternative embodiment, the re-threshing is carried out by the threshing apparatus 26, and the tailings are returned through an opening proximate, but upstream of, the threshing and separating rotors 28.

Turning back to FIG. 3, the tailings stream is fluid and accumulates in transit upon an inside surface 82' of the ejection channel 82, as represented by area A, before being conveyed with momentum through the opening 84. The height B of the accumulated tailings material upon the inside of ejection channel 82 is proportional to the volume flow rate of the tailings being conveyed through the tailings return system 70 at any one time. A proximity sensor 90 is mounted to the ejection channel 82.

An active component 90' (FIG. 4) of proximity sensor 90 is of the infra-red type such as model GP2Y0A41SK0F, manufactured by Sharp Electronics Corporation, of Montvale, N.J., having a measuring range of approximately 4 cm to 16 cm. The sensor 90 is mounted on an exterior surface 82" of the ejection channel 82 against a window 86 provided in the wall thereof.

Figure 4:
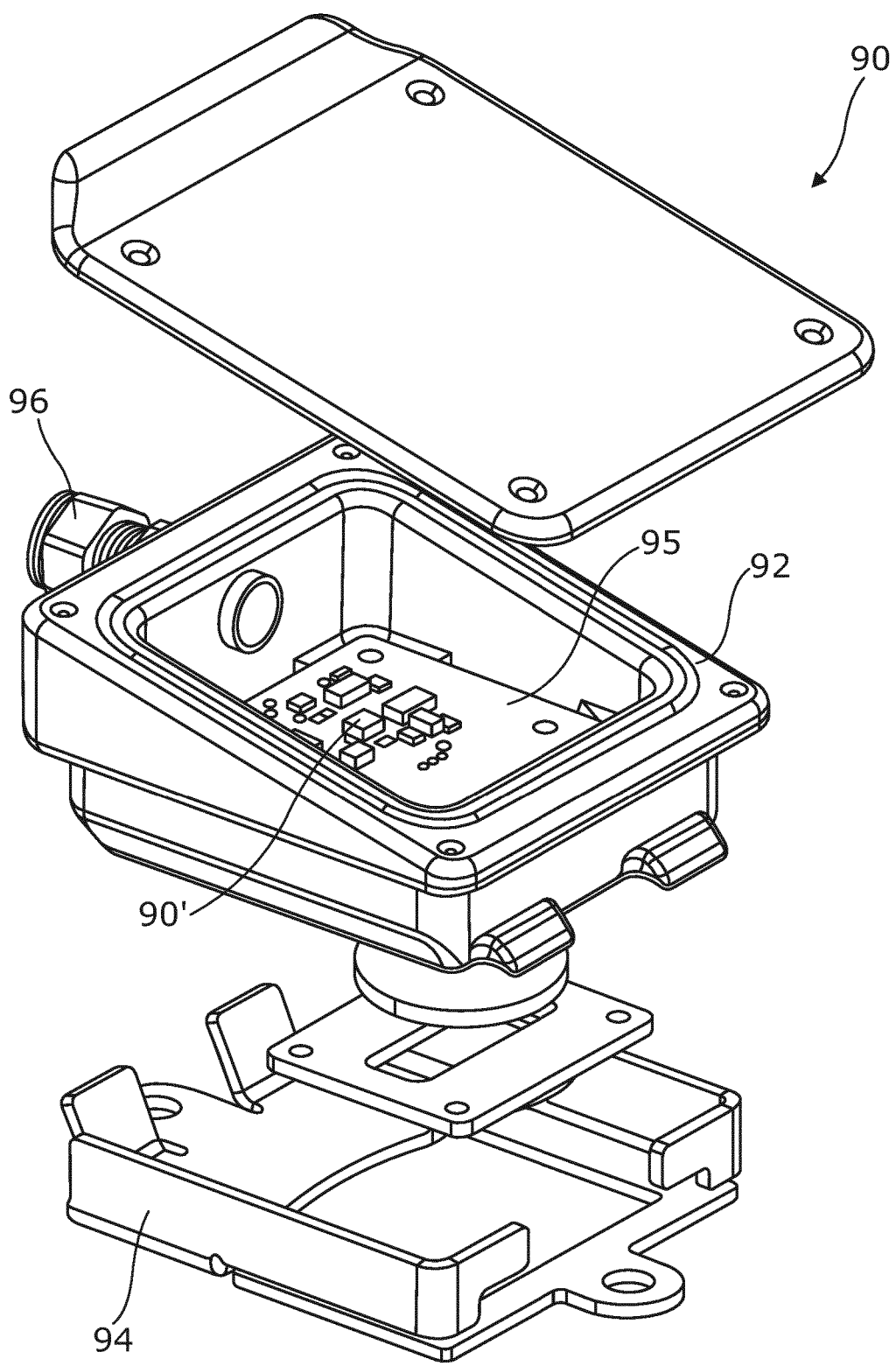
FIG. 4 is an exploded perspective view of a proximity sensor that may be used in the tailing return system shown in FIG. 1.

FIG. 4 shows an exploded view of a sensor 90 which includes a box-type housing 92 and a mounting device 94 which is secured to the exterior surface 82" (FIG. 3) of the ejection channel 82. The active sensor component 90' is mounted upon a circuit board 95 secured inside the housing 92, and is connected to an ECU 100 via a conduit 96.

The proximity sensor 90 is configured to sense the distance C (FIG. 3) between the sensor 90 and the top of material layer A and communicate a representative signal to the ECU 100. The ECU 100 is then operable to calculate the material volume flow from the signal.

Although described as employing a screw auger and an impellor to convey the tailings stream through the ejection channel, the tailings return system may use alternative means to propel the tailings such as a blower that creates a pressurized airstream.

In summary, there is provided a combine harvester tailings return system which includes a tailings conveyor and an ejection channel for depositing tailings upstream of a cleaning system. A proximity sensor is mounted to the ejection channel and is configured to sense the height of a layer of tailings during transit through the returns system.

It should be emphasized that the above-described embodiments of the present disclosure are merely possible examples of implementation, merely set forth for a clear understanding of the principles of the disclosure. Many variations and modifications may be made to the above-described embodiments of the disclosure without departing substantially from the spirit and principles of the disclosure.

The invention claimed is:

1. A combine harvester comprising:
a frame having a pair of side walls;
a grain cleaning system located between the side walls; and
a tailings return system arranged to collect tailings ejected by the grain cleaning system, wherein the tailings return system comprises:
a conveyance channel located outboard of the side walls;
an ejection channel connected between a downstream end of the conveyance channel and an opening in one of the side walls at a location upstream of the cleaning system; and
a proximity sensor mounted to the ejection channel and configured to sense a thickness of a material layer in the ejection channel.

2. The combine harvester of claim 1, wherein the proximity sensor is mounted on an exterior surface of the ejection channel against a window in a wall of the ejection channel.

3. The combine harvester of claim 1, wherein the proximity sensor comprises an infrared proximity sensor.

4. The combine harvester of claim 1, wherein the tailings return system further comprises an impellor housed upstream of the ejection channel, wherein the impellor comprises a plurality of paddles operable to rotate and project a tailings stream toward and through the ejection channel.

5. The combine harvester of claim 4, wherein the impellor is housed inside the downstream end of the conveyance channel.

6. The combine harvester of claim 5, wherein the tailings return system comprises a screw conveyor extending inside of the conveyance channel, and wherein the impellor and screw conveyor are mounted upon a common shaft.

7. The combine harvester of claim 1, further comprising threshing and separating apparatus between the side walls, wherein the opening is located downstream of the threshing and separating apparatus.

8. The combine harvester of claim 1, wherein the tailings return system comprises a secondary threshing unit for threshing a tailings stream conveyed therethrough.

9. The combine harvester of claim 8, wherein the secondary threshing unit comprises a plurality of threshing bars.

10. The combine harvester of claim 9, wherein the secondary threshing unit comprises an arcuate cover, and wherein the threshing bars are secured to an inner surface of the arcuate cover.

11. The combine harvester of claim 8, wherein the secondary threshing unit comprises an impellor housed upstream of the ejection channel, wherein the impellor comprises a plurality of paddles operable to rotate and project a tailings stream toward and through the ejection channel.

* * * * *